United States Patent [19]

Bauer et al.

[11] Patent Number: 4,899,377
[45] Date of Patent: Feb. 6, 1990

[54] COMMUNICATION TERMINAL TELEPHONE DIRECTORY WITH DYNAMIC DIRECTORY TABBING

[75] Inventors: Eric J. Bauer, Matawan; Esther L. Davenport, Dunellen; Mary Kinal, North Plainfield, all of N.J.; Michael C. King, Boulder, Colo.

[73] Assignees: American Telephone and Telegraph Company, New York, N.Y.; AT&T Information Systems Inc., Morristown, N.J.

[21] Appl. No.: 808,015

[22] Filed: Dec. 10, 1985

[51] Int. Cl.⁴ .............................................. H04M 1/27
[52] U.S. Cl. .................................... 379/354; 379/355; 340/712
[58] Field of Search ........... 179/90 BD, 90 BB, 90 B; 379/96, 354, 355, 356; 340/709, 710, 712

[56] References Cited

U.S. PATENT DOCUMENTS 3,242,470  3/1966  Hagelbarger et al. ........... 364/9 DD
4,291,198  9/1981  Anderson et al. ................ 179/2 DP

OTHER PUBLICATIONS

The Bell System Technical Journal, Jan. 1983, "An Experimental Teleterminal-The Software Strategy", Bayer, D. L. and Thompson, R. A.
The Bell System Technical Journal, Jan. 1983, "Experimental Teleterminals-Hardware", Hagelbarger, D. W., Anderson, R. V., and Kubik, P. S.
IEEE Communications Magazine, Feb. 1985, vol. 23, No. 2, pp. 21-26, "An Interactive Touch Phone for Office Automation", by Messrs. Hsing, Quach, LeBlanc and Stoddard.
Proc. ICC [84, Amsterdam, May 14-17, 1984, "An Interactive Touch Phone for Future Offices", by Messrs. Hsing, Quach, LeBlanc, Mednick and Abraham, pp. 272-275.
Personal Computing—A Hayden Publication, The Plug Edition, Mar. 1985, Advertisement pages and a Special Report extract "'Lap' Portables—How small is too small?", pp. 83-97, by E. Foster.
The Cypress Personal Communication Terminal from ROLM—pamphlet from ROLM Corporation.
Teleconnect—A Monthly Telecommunications Magazine, May 1985, pp. 143-163, "Are Workstations Camels?" by editors, A Week of Workstations, by B. Page.
Teleconnect—A Monthly Telecommunications Magazine, Jan. 1984, "Executive Workstations" by K. Zita.

Primary Examiner—Michael J. Tokar
Assistant Examiner—Laurence G. Fess
Attorney, Agent, or Firm—Frederick B. Luludis

[57] ABSTRACT

The names in a directory stored in a personal terminal having a display are displayed as groups of names in which illustratively the first name in each group of names serves as a displayed tab which is pointed to by the user to display the respective group of names. The individual tabs are dynamically changed to conform with any change in the first name of the respective groups of names that may occur as a result of a change in the composition of the directory.

9 Claims, 8 Drawing Sheets

FIG. 3

LOCAL DIRECTORY — 10

| 4813 IDLE | | | | | | |
|---|---|---|---|---|---|---|
| ▦ [ABBOT]  ▦ JOHNSO  ▦ PEAK  ▦ ROSA  ▦ SMALL  ▦ 17  ▦ ALPHA/GROUP |
| 11 | 12 | 13 | 14 | 15 | 16 | |

▦ ABBOT
5556321
SALES

▦ ANDERSON, B
2344345
ENGR.

▦ ANDERSON, J
2344545
SUP.

▦ BAXTER
2344242

▦ CHOMEX
2125551234
BRONX

▦ DAVE
3415555
PLUMBER

▦ EVANS, A
3416262

▦ ...

▦ ...

▦ ...

▦ HARRY
5556789

▦ ...

▦ ...

▦ JOHNSEN, A
5558762

▦ PREV PAGE   ▦ NEXT PAGE   ▦ CALL   ▦ DATA SCREEN   ▦ EDIT DIRECTORY   ▦ OTHER DIRECTORY   ▦ SHOW MODE   ▦ MENU BLOCKS

PAINT DIRECTORY SCREEN

COMMUNICATION TERMINAL TELEPHONE DIRECTORY WITH DYNAMIC DIRECTORY TABBING

TECHNICAL FIELD

This invention relates to a telephone directory arrangement that is displayed on the screen of a communication terminal.

BACKGROUND OF THE INVENTION

Communication terminals, such as desk top terminals, personal terminals and personal workstations, are typically arranged to allow the user to create a personal telephone directory, which can be displayed on the terminal screen. Names and associated telephone numbers inputted by the user are typically displayed in alphabetical order by a terminal directory program. To "look up" a particular telephone number, the user types in the name, or a portion thereof, associated with tee sought-after telephone number, using a terminal keyboard. The terminal directory program then searches a telephone directory stored in terminal memory for a match between the inputted letters and/or characters and those stored in a directory name field. When the program "finds" a match, it displays the name and sought-after telephone number.

However, if the user misspells the name, or if the directory contains a plurality of names having the same surname, it is possible that the displayed name and telephone number will not be the one sought by the user. Consequently, the user either tries to locate the sought-after telephone number by inputting a different spelling of the name or by scrolling through the directory.

We have recognized that such prior directory arrangements are not efficient from the standpoint that they require the user to either type in a name to obtain the sought-after telephone number or to scroll through a directory which may contain a large number of entries and from the standpoint that the telephone number that is eventually displayed may not be the sought-after number.

SUMMARY OF THE INVENTION

Our telephone directory arrangement obviates the problems exhibited by prior arrangements by (a) displaying a plurality of labels on the terminal screen representing respective groups of directory entries, (b) displaying an individual one of the groups of entries when the terminal user points to the respective label, or tab, and (c) dynamically changing individual ones of the tabs when the composition of the directory changes in a way that necessitates such changes.

Illustratively, the displayed tabs are formed from the first entry in the respective groups of entries so that the user can immediately identify which group of entries contains the pertinent name and hence the sought-after telephone number. Accordingly, when the user points to a tab, the names in the respective group are displayed beginning with the first name in the group. When the composition of the directory changes such that the first entry in one of the groups of entries changes, the respective tab is reformed from the new first entry and is displayed as the tab for the respective group.

BRIEF DESCRIPTION OF THE DRAWINGS

FIGS. 2 and 3 are respective specific versions of the directory screen of FIG. 1;

DETAILED DESCRIPTION

Figure 1:
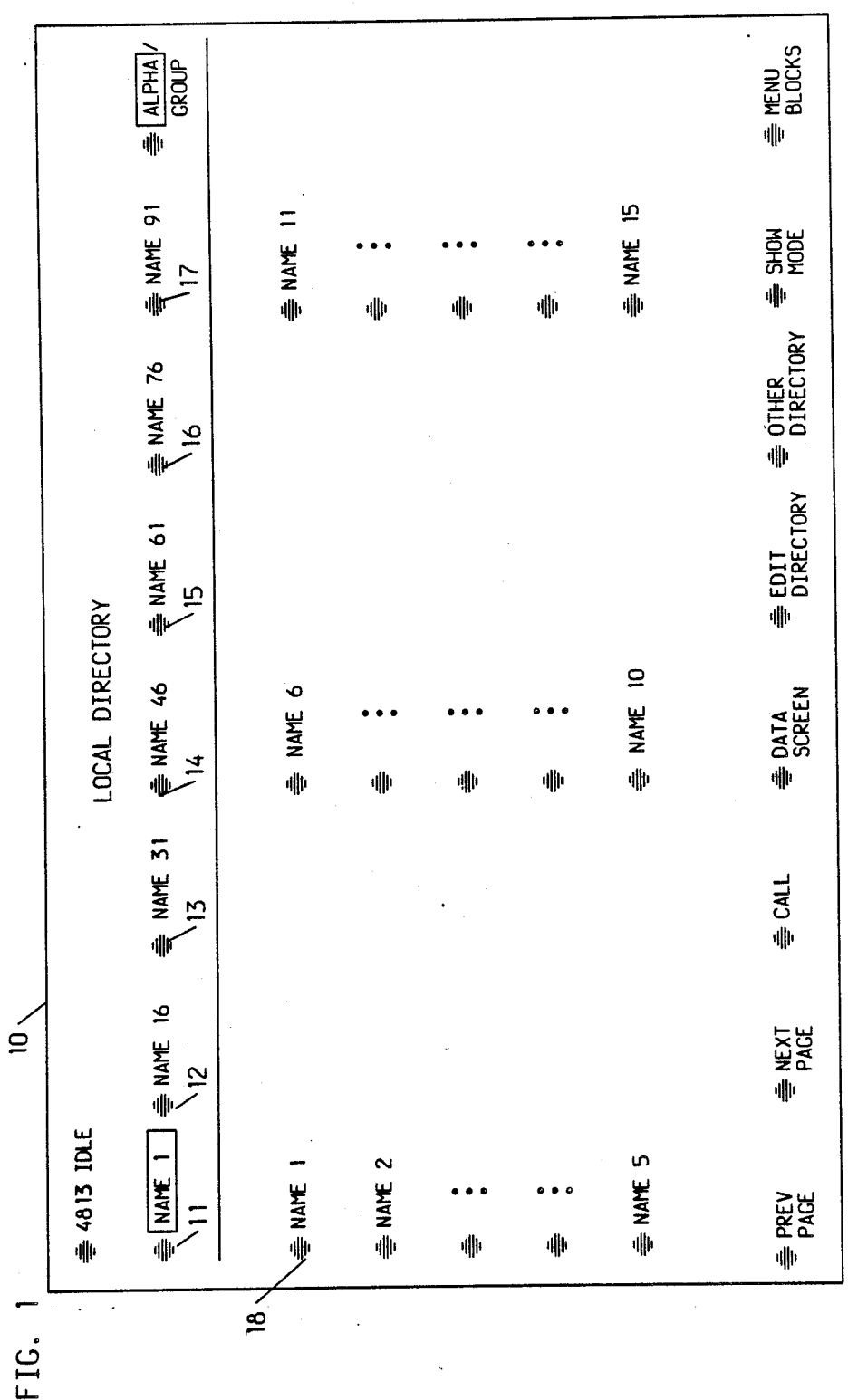
FIG. 1 illustrates a generalized version of a directory screen which may be displayed on the CRT of a personal terminal.

FIG. 1 shows, in a generalized form, a local telephone directory screen 10 which can be displayed on the cathode ray tube (CRT), of a personal terminal, such as the AT&T Personal Terminal, Model 510D (PT510). The PT510 includes, inter alia, a digital telephone station set and handset which connect to a digital PBX via a bidirectional communication path. The bidirectional communication path serves as a "telephone line" for exchanging voice and data messages between the PT510 and the digital PBX. The PT510 also includes an optically-based touch-sensitive screen of the type disclosed in U.S. Pat. No. 4,414,179 issued Nov. 20, 1984 to L. R. Kasday. The optically-based touch-sensitive screen is a transparent, compliant surface which overlays the surface of the CRT through which light from the CRT may pass and is used to determine the position of a finger touch. The following discussion will be given in the context of the PT510; however, it is to be understood by those skilled in the art that the invention may be practiced with most commercially available personal terminals, or workstations.

Local directory screen 10 is displayed on the CRT whenever the user touches a touch target labeled DIRECTORY, which is one of a plurality of touch targets displayed along the bottom of a previously displayed screen (not shown), such as the screen referred to as the phone screen. The touch targets that are displayed along the bottom of various PT510 screens are called "action blocks," such as the action blocks displayed along the bottom of screen 10 (discussed below). An example of the phone screen is shown in the AT&T Personal Terminal Model 510D User's Guide, which can be obtained from AT&T Customer Information Center, 2855 North Franklin Road, P. 0. Box 19901, Indianapolis, Ind. 46219, as Document No. 999-300-252IS, and which is incorporated herein by reference.

Continuing, the terminal telephone directory, which is stored in memory contained within the PT510, is comprised of a plurality of records which comprise illustratively 105 names, associated telephone numbers and comments. Each record in the directory contains (a) a name field, for storing a name inputted by the user, such as NAME 1 shown in FIG. 1, (b) a telephone field, for storing a telephone number associated with the name stored in the name field (not shown), and (c) a comment field, for storing a comment that is also associated with the name stored in the name field (not shown). The names in the directory are displayed in groups of illustratively 15 names, in which each group of names is displayed as three columns of five names each.

As shown in FIG. 1, directory screen 10 includes a plurality of symbols in the form of circles, each representing a touch target that may be touched by the user to activate, or invoke, a particular terminal function. For example, the user may place a telephone call to the telephone number associated with NAME 1 by touching touch target 18, which causes the telephone number and comment associated with NAME 1 to be displayed on screen 10. Upon the user touching target 18, the PT510 automatically activates the terminal speakerphone and "dials" the associated telephone number as though the number were dialed by the user. (The term "touching a target" and the variants of that term as used herein is meant to include other terms that are understood by the art and which define similar functions. For example, it is to mean "pointed to" as one would point to displayed text by moving the screen cursor to the location of the text, as one would point to a screen that employs a non-optically-based touch screen, or even as one would point to displayed text using terminal buttons, such as keyboard buttons.)

Touch targets 11 through 17 and their associated labels serve, in accordance with a feature of the invention, as tabs in which each tab points to illustratively the first name in a respective group of illustratively 15 names that are contained in the directory.

For example, touch target 11 serves as a tab for the first 15 names (NAME 1–NAME 15) contained in the directory. If the user is seeking a name which alphabetically follows NAME 15, the user would then select a tab by touching one of the targets 12 through 17. If the user happens to touch tab 12, for example, NAMES 1 through 15 are erased from the screen and are replaced by the next group of names, i.e., NAME 16 through NAME 30. (Alternatively, the user could step through each group of fifteen names by repeatedly touching the action block labeled NEXT PAGE, as mentioned below.)

Screen 10 includes other touch targets, such as the above-mentioned action blocks displayed along the bottom of screen 10, which are not relevant to the invention discussed herein but which, for completeness, will be mentioned briefly. (A description of the functions performed by the action blocks is provided in the abovementioned PT510 User's Guide.) The action blocks PREV PAGE and NEXT PAGE allow the user to scroll through the groups of names in the telephone directory. The group directory is displayed when ALPHA is highlighted and the user touches the touch target labeled ALPHA/GROUP. The target labeled DATA SCREEN causes a data screen to be displayed in place of screen 10 and the target labeled OTHER DIRECTORY allows the user to access a telephone directory stored in a RAM-based cartridge (discussed below). The target labeled MENU BLOCKS causes a different set of labeled action blocks to be displayed along the bottom of screen 10. The target labeled 4813 IDLE displays the status of the user's primary telephone line, for example, line 4813. The displayed IDLE status changes to RING whenever an incoming call appears on that telephone line. In addition, the line status changes from RING to ACTIVE when an incoming call is answered and changes from ACTIVE to HOLD when a call on that telephone line is placed on hold.

When the user changes the composition of the directory by either adding or deleting a name, then, in accordance with the invention, individual ones of the groups of names are reformed as they are being displayed to reflect the change in the directory and individual ones of the tabs are re-created, or changed, as needed.

Figure 2:
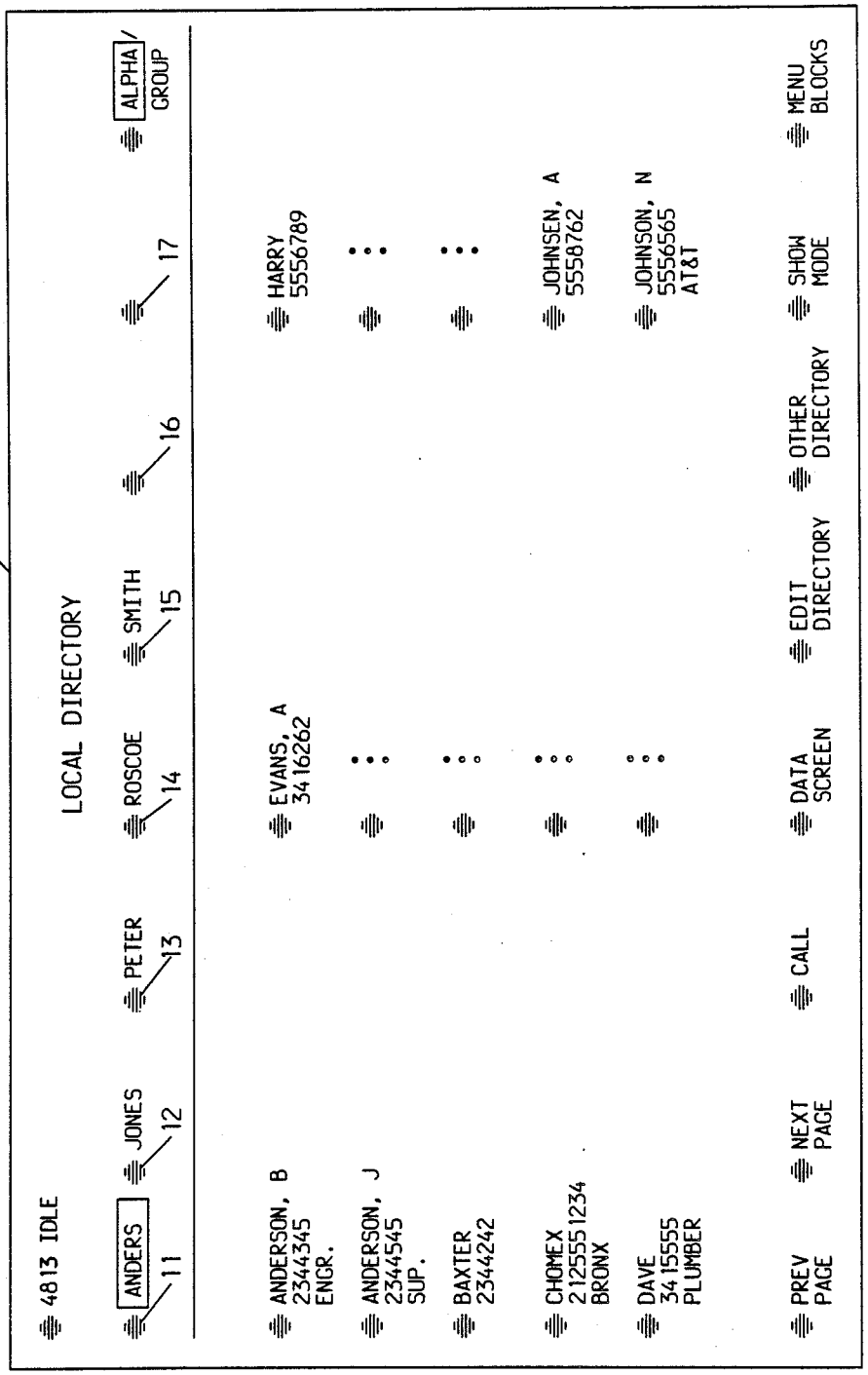

In particular, FIG. 2 shows an example of directory screen 10 in which the first group of 15 names in the directory are displayed. For drawing clarity, ones of the first 15 names are not explicitly shown. Also shown are the telephone numbers and comments, if any, associated with each of the displayed names. The telephone numbers and comments are displayed when the user touches the target labeled SHOW MODE. (As a means of conserving space in memory, the hyphen that is usually shown between the exchange code and extension number of a telephone number is not stored in memory. Accordingly, displayed telephone numbers are not hyphenated.)

It is assumed at this point in the discussion that the directory contains 61 entries. As a result, tabs 11 through 15 are labeled using the first six letters of the first entry in each of the first five groups of names in the directory, respectively. The labels associated with tabs 16 and 17 are blank, since there are no name entries for those groups in the directory.

It is seen from FIG. 2 that the first six letters of ANDERSON, B, which is the first entry in the directory, serves as the label for tab 11. The names JONES, PETER, ROSCOE and SMITH, which are assumed to be the sixteenth, thirty-first, forty-sixth and sixty-first names in the directory, serve as the labels for tabs 12 through 15, respectively. If the user touches, for example, tab 13, screen 10 is erased and then re-painted with the group of names comprising the thirty-first through forty-fifth names in the directory being displayed, starting with the name PETER and the next fourteen entries which immediately succeed that name alphabetically. If, on the other hand, the user touches tab 15, the sixty-first through seventyfifth names in the directory are displayed. In this instance, however, only the name SMITH is displayed, since the directory only contains 61 entries, as assumed above.

If the user changes, or edits, the directory (as discussed below) by, for example, adding the name ABBOT to the directory, then in accordance with the invention, the tabs dynamically change to reflect the change in the directory. The labeling of each of tabs 11 through 17 changes in this instance since the name ABBOT alphabetically precedes the name ANDERSON, B, thereby changing the ordinal position of each of the names in the directory. As a result, the name ANDERSON, B becomes the second name in the directory, the name ANDERSON, J becomes the third name in the directory, and so on. Accordingly, the name ABBOT is displayed as the first name in the first group of displayed names rather than the name ANDERSON, B and is displayed as the label for tab 11 that is associated with that group.

FIG. 3 illustrates the result of adding the name ABBOT to the directory. It is seen from FIG. 3 that tabs 11 through 15 are relabeled, in accordance with the invention, as a result of a change in the ordinal position of each of the names in the directory. The label for tab 12 has changed from JONES to JOHNSO as a consequence of the name JOHNSON, N becoming the sixteenth name in the directory. Also, the labeling of tabs 13 through 15 have changed, since illustratively the names PEAK, ROSA and SMALL have now become the thirty-first, forty-sixth and sixty-first entries as a result of reforming those groups of names.

If, for example, the user adds yet another 14 names to the directory, thereby expanding the directory to 76 entries, then the first six characters of the seventysixth name in the directory would be displayed as the label for tab 16. Moreover, the seventy-sixth name would be the only name that is displayed when the user touches tab 16, since that entry would constitute the first and only entry in the group of entries formed from entries 76 through 90.

Similarly, if the user deletes a name from the directory, for example, the name CHOMEX shown in FIG. 3, then the labels of tabs 12 through 15 dynamically change as a result of that directory change. In this instance, the deletion of the name CHOMEX from the directory would cause the groups of names to be reformed. As a result, tabs 12 through 15 are dynamically relabeled to those shown in FIG. 2. The labeling of tab 11 is not affected by the deletion of the name CHOMEX from the directory, since the name ABBOT remains as the first name in the first reformed group of 15 names in the directory.

Figure 4:
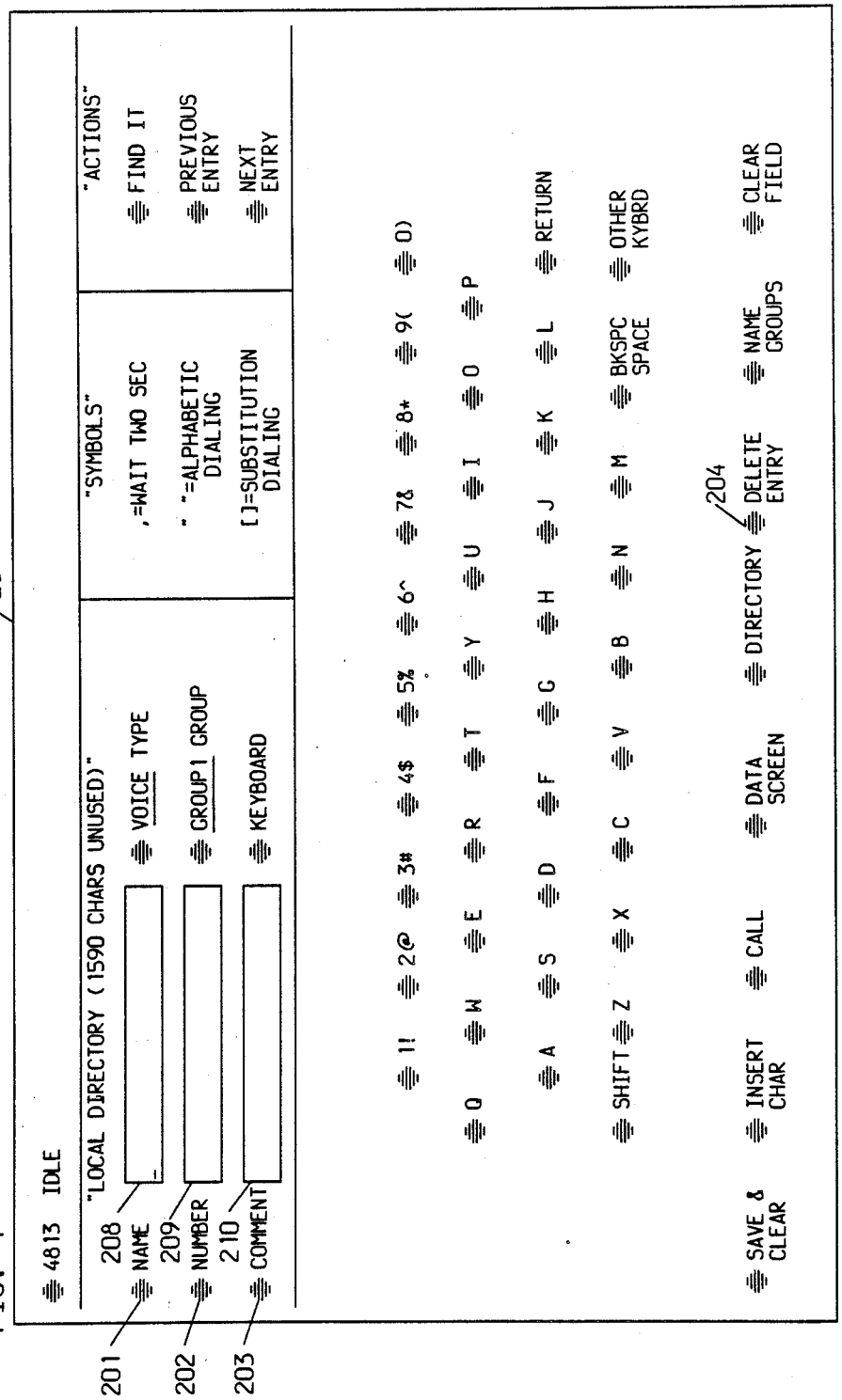
FIG. 4 shows a directory editor screen used by the terminal user to edit the stored directory.

To edit the stored directory, the user touches the touch target labeled EDIT DIRECTORY in the action blocks displayed at the bottom of the screen 10. When that touch target is touched, directory screen 10 is erased and a PT510 program displays edit directory screen 20, shown in FIG. 4.

To enter letters, characters or numbers into the directory, the user may use a standard keyboard (not shown) that connects to the PT510. The user, on the other hand, may enter the information using the keyboard that is displayed on the PT510 CRT screen when the touch target labeled KEYBOARD is touched. The displayed keyboard is actually displayed in two parts, the first part being shown in FIG. 4. The second part (not shown) is displayed when the user touches the touch target labeled OTHER KEYBD. The other keyboard is used for "typing in" characters and control signals, such as cursor control to move the screen cursor, commas, parentheses, and other symbols and characters that are normally associated with a standard keyboard.

Directory entries are made in the name, number and comment fields under the local directory header. Each field can contain up to illustratively 20 characters. To enter a name, the user touches touch target 201 labeled NAME and types in the name that is to be added to the directory using either the displayed keyboard or the PT510 keyboard. The telephone number that is associated with the inputted name that is displayed in highlighted field 208 is entered by touching touch target 202 and typing in the telephone number, which is displayed in field 209. A comment can be entered by touching touch target 203 and typing in the comment, which is displayed in field 210.

The inputted name, telephone number and comment are actually stored in the directory by either touching the touch target labeled SAVE & CLEAR or by touching the touch target labeled DIRECTORY. Touching the latter target, in addition, causes the edit directory screen 20 to be erased and causes screen 10 to be re-displayed.

An entry in the telephone directory can be deleted therefrom by typing in the name to be deleted in the name field 208 of edit directory screen 20 and touching the touch target 204 labeled DELETE ENTRY.

Figure 5:
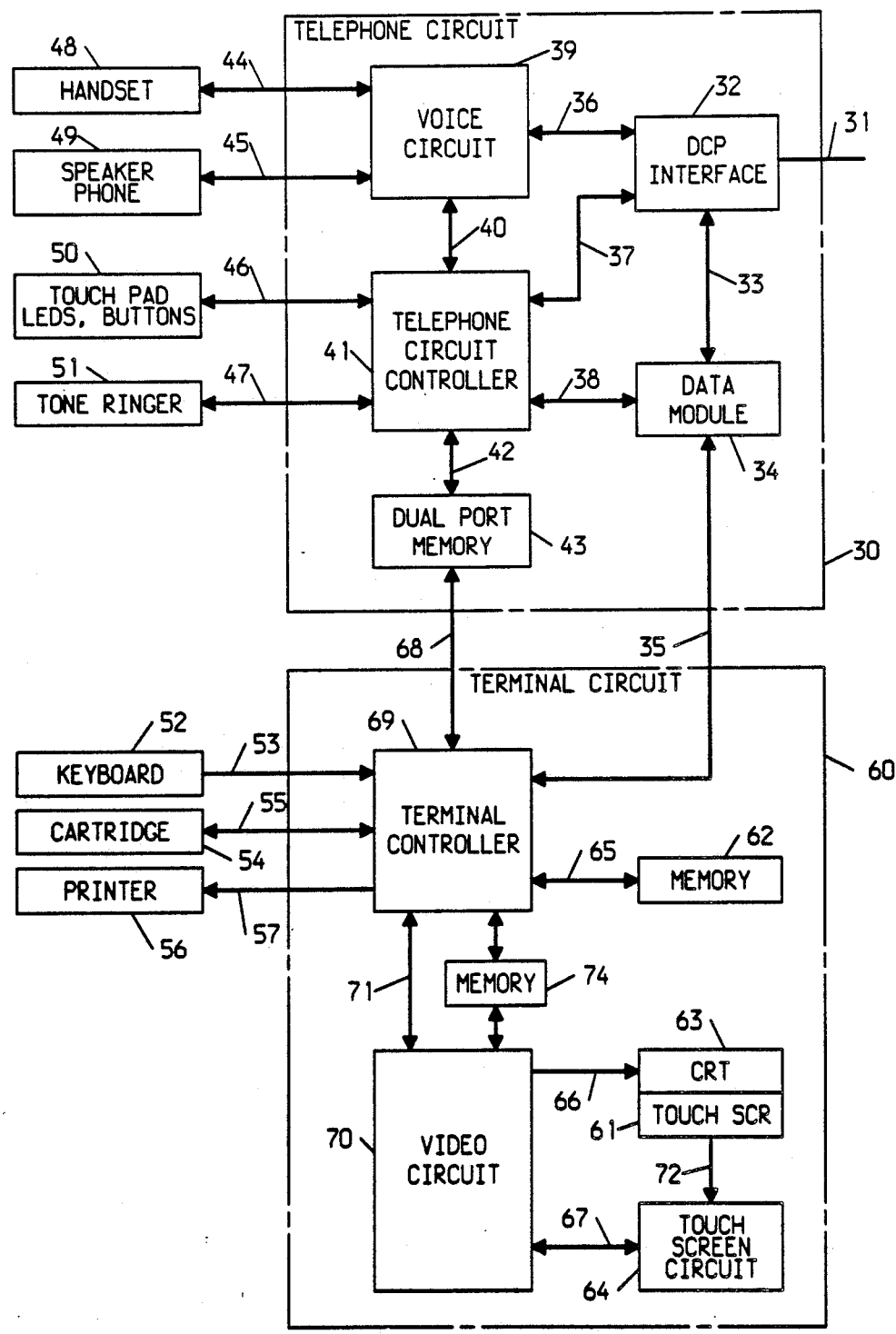
FIG. 5 is a block diagram of a personal terminal arranged to embody the principles of the invention.

Referring now to FIG. 5, there is shown a block diagram of the PT510. Telephone circuit 30 is arranged to perform terminal telephone functions, such as outputting the digits of a telephone number to bus 31. Circuit 30, inter alia, also (a) scans terminal buttons 50 to determine their status, (b) illuminates and extinguishes light emitting diodes 50 in response to a change in the status of, for example, terminal buttons 50, (c) operates tone ringer 51 over lead 47 to alert the user to an incoming call and (d) switches voice circuit 39 from telephone handset 48 to speakerphone 49 when the user operates the speakerphone button 50.

Terminal circuit 60 is arranged to perform terminal video functions, such as painting different screen patterns on CRT 63. It is also arranged to (a) receive keyboard signals from keyboard 52 over bus 53, (b) read the contents of RAM-based cartridge 54 over bus 55 for storage in memory 62 and (c) send information that is displayed on CRT 63 to printer 56 over bus 57.

Specifically, telephone circuit 30 exchanges information with a digital PBX, such as AT&T's System 75 or System 85, over bidirectional bus 31. Bus 31 is arranged into two time-separated information channels, which transport information that is exchanged between the PBX and either circuit 30 or circuit 60. Bus 31 is also arranged into a one-bit signaling channel, which is time-separated from the information channels and which transports signaling information between the PBX and telephone circuit controller 41. The signaling information is accumulated one bit at a time over a successive number of bus frames by DCP interface circuit 32. When circuit 32 has assembled a signaling message, it passes the message to controller 41 over bus 37.

DCP interface circuit 32 is also arranged to exchange data messages with data module 34 and voice messages with voice circuit 39 over buses 33 and 36, respectively. Such messages are transmitted and received over bus 31 information channels.

Voice circuit 39 shapes and adjusts the gain of voice signals that it exchanges with either handset 48 or speakerphone 49 and is arranged to convert voice signals that it receives into digital signals, which are formed into messages for transmission over bus 31 via DCP interface circuit 32.

Telephone circuit controller 41 is arranged to exchange messages with terminal controller 69 via dual port RAM memory 43. For example, when a call is received via bus 31, controller 41 forms a message indicative of that fact and stores the message in dual port RAM memory 43 via bus 42. Terminal controller 69 unloads the message via bus 68 and in response thereto directs video circuit 70 to change the displayed status of the telephone line identified in the message, for example, line 4813 shown on FIGS. 1-4. Controller 41 also processes signaling messages received from DCP interface circuit 32, as mentioned above, and sets the transmission parameters, such as parity, baud rate, etc., of messages received by data module 34 from terminal controller 69 over bus 35, in which such messages are transmitted, for example, to a host computer via bus 31 and the PBX.

Terminal controller 69, as will be discussed below, is arranged to display different patterns (screens) on CRT 63, such as screens 10 and 20. The information which controls the pattern of a screen is stored in memory 74, the latter being comprised of ROM memory and RAM memory. The ROM portion of memory 74 stores the predetermined format of the various screens, such as the banner (name of the screen), touch targets, action blocks, etc. The RAM portion of memory 74 stores the dynamic entries that are displayed on the screen, such as names and telephone numbers. A screen is actually painted on CRT 63 by video circuit 70 using the information stored in memory 74. To paint a screen on CRT 63, controller 69 sets pointers to memory 74 ROM locations at which is stored the predetermined format of the screen and sets pointers to locations in the RAM portion of memory 74 at which are stored the dynamic entries that are displayed on the screen. Video circuit 70 unloads the information stored at the locations identified by the pointers and displays the information on CRT 63.

Video circuit 70 is also arranged to track the position of the CRT electron beam and to generate a signal, which is passed to touch screen circuit 64 over one of the leads 67 when a touch target is displayed on CRT 63.

As discussed earlier, optically-based touch screen 61 is used to determine the position of a finger touch over the surface of CRT 63 and is a transparent and parallel surface device for overlaying the CRT screen and through which light from the CRT may pass. When a touch target is touched by the user, light from the CRT raster beam becomes trapped within touch screen 61 by total internal reflection. This trapped light travels to an edge of touch screen 61 and is detected by photodetectors (not shown) mounted along the edge of touch screen 61. Since internal reflection occurs at the time the CRT raster beam passes under the finger, the raster beam timing (performed by video circuit 70) is used to determine the position of the touch. The position (i.e., X and Y screen coordinates) of the touch is passed to terminal controller 69 via bus 71. Terminal controller 69 interprets the X and Y coordinates of the touch point to determine if a touch target is displayed at that location. If a touch target is being displayed at the relevant coordinates, then terminal controller 69 takes appropriate action commensurate with the function of the touched target, such as displaying directory screen 10.

Some light from the CRT electron beam always becomes trapped within touch screen 61. The level of trapped light from an untouched target is lower, however, than the level of light that becomes trapped within touch screen 61 when a touch target is touched. Touch screen circuit 64 is a voltage threshold circuit that is arranged to distinguish between signals which are outputted by touch screen 61 photodiodes when a touch target is touched and signals which are outputted when a touch target is not touched. Touch screen circuit 64 notifies video circuit 70 over one of the leads 67 whenever it determines that such signals are the result of a touched target. Touch screen circuit 64 is further disclosed in copending U.S. patent application Ser. No. 715,278 to P. S. DiPiazza et al.

The PT510 is arranged as a state machine driven by the displayed screens. In general, data inputs to the PT510 are loaded into queues during the time that interrupt programs are running. The queues are unloaded and the data is processed by programs invoked by an operating system program (main loop). Each screen-based application, for example, directory screen 10, causes several screen-based programs to be invoked which (a) paint the application screen on the CRT, (b) process keyboard data (originating from either keyboard 52 or the displayed keyboard), and (c) process touch target data and exit the application. Interrupt service programs are also used to exchange data with I/0 devices such as keyboard 52.

Figure 6:
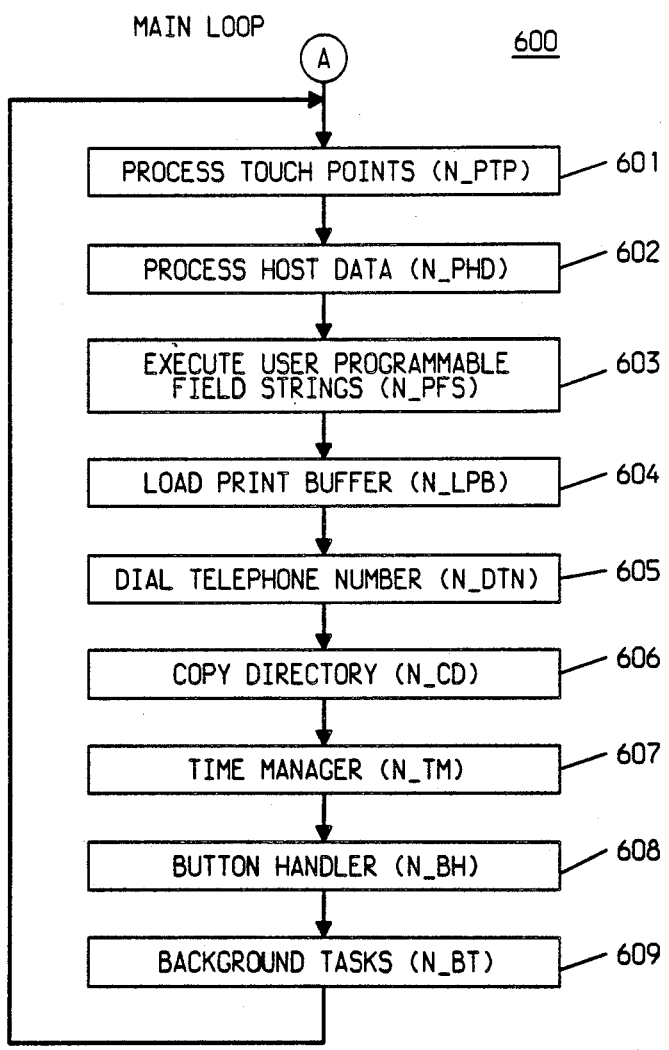
FIG. 6 is a program flow chart detailing the main program used within the terminal of FIG. 5.

FIG. 6 illustrates the PT510 main loop program 600 which is stored in memory 62 and which is run by terminal controller 69. When each of the blocks 601 through 609 is entered, it processes the data, if any, stored in its assigned queue. Data stored in a queue may be processed over one or more passes through loop program 600, as will be pointed out below. If no data is stored in a queue, then execution immediately proceeds to the next block in program 600.

At block 601, in particular, program 600 determines if any user input, such as keyboard 52 data or touch target data, needs to be processed, as will be discussed below. At block 602, program 600 processes data that is exchanged with a host computer. For example, "WAIT" is an interactive command that is formed into a message and transmitted via bus 31 to the host computer. The host computer receiving the command returns a prompt signal to the PT510. The prompt is displayed on CRT 63 as an indication to the user that the host computer received the command.

At block 603, program 600 processes inputs originating from PT510 programmable buttons, the latter being programmed by the user to effect particular functions. For example, a programmable button may be programmed to represent a particular word processing command, such as the NROFF command of the UNIX TM operating system and the field strings associated therewith. When a programmable button is touched by the user, block 603 processes the command that is programmed behind the button as though the command were manually inputted by the user via, for example, keyboard 52.

At block 604, program 600, in response to userinputted print commands, transfers information that is being displayed on CRT 63 to a print buffer within printer 56. Printer 56, in turn, unloads its buffer and prints out a "hard copy" of the displayed information.

At block 605, program 600 performs a telephone dialing function in response to receiving a touch signal when a directory screen is displayed (such as the signal originating from touch target 18 of FIG. 1 when it is touched by the user). Block 605 sends the telephone number associated with the touched target to the PBX via controller 41. Block 605 does this by sending the telephone number one digit at a time, in which the digit is formed into a message that is transmitted to the PBX via bus 31. Block 605 also performs interdigit timing to emulate the manner in which a telephone number is typically dialed from a telephone station set.

At block 606, program 600 copies the local directory stored in memory 62 into RAM-based cartridge 54 in response to a user command. Block 606 also reads directory information that is stored in cartridge 54 and writes that information into memory 62. Block 606 does this by exchanging one directory record (name, telephone and comment) between memory 62 and cartridge 54 each time it is entered.

At block 607, program 600 processes user time management information, such as reminder messages and alarm times inputted by the user via a time manager screen that can be brought up on CRT 63. For example, when block 607 is entered, it compares the date and time of each stored alarm reminder with the output of a PT510 software clock program (not shown). If the date and time of an alarm matches the date and time outputted by the clock program, block 607 causes the word "ALARM" to be flashed in the banner field of the screen pattern that is displayed on CRT 63. If the user touches a touch target associated with the flashing "ALARM", block 607 causes the current screen to be erased and the time manager screen to be displayed with the relevant reminder message highlighted.

At block 608, program 600 scans the leads connected to PT510 buttons, such as keypad buttons, to determine their status, i.e., whether the user is operating one of the buttons.

At block 609, program 600 performs miscellaneous tasks, such as determining whether cartridge 54 is connected to the PT510. It does this by sending a signal over bus 55 and waiting for a response therefrom. If a signal is returned over bus 55, then block 609 concludes that cartridge 54 is connected to the PT510; otherwise, it concludes that a cartridge is not connected. Program 600 returns to block 601 upon completing the miscellaneous tasks.

Figure 7:
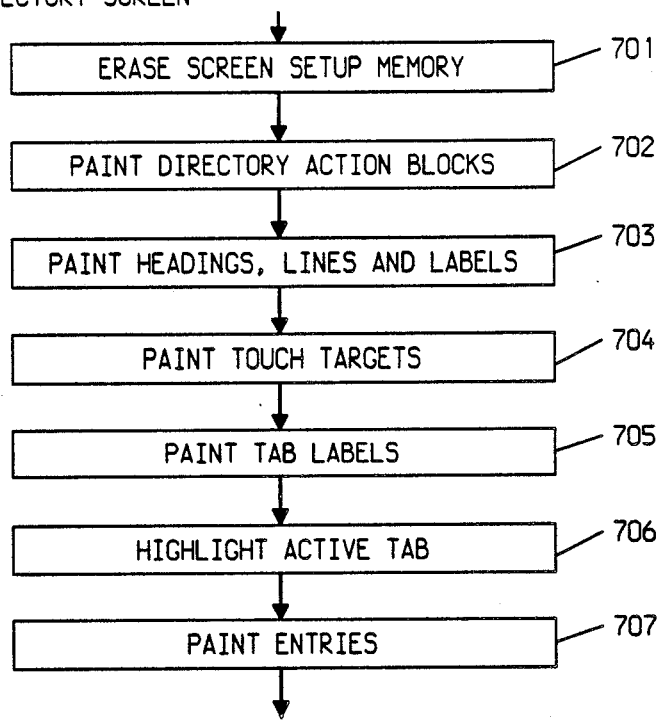
FIG. 7 is a program flow chart that is invoked by the program of FIG. 6 to paint the directory screen of FIGS. 2 and 3 on the CRT of the terminal of FIG. 5.

Turning now to FIG. 7, there is shown in flow diagram form the program which paints directory screens, such as screen 10, on CRT 63 and which is a program that is invoked by block 601 of FIG. 6.

As mentioned above, to paint a directory screen on CRT 63, program 700 loads pointers, or addresses, into memory 74 which directs video circuit 70 to other locations in memory 74. These other locations contain predetermined information that is to be displayed on CRT 63, such as the format of the screen. Program 700 also sets pointers to the location of stored information that it forms "on-the-fly", such as name entries and tab labels, this latter information being stored in the RAM portion of memory 74 as mentioned above.

In particular, at block 701, program 700 erases the current screen that is being displayed on CRT 63 and at block 702 sets the pointers in memory 74 to point to predetermined, or "canned", information that is used to paint the above-discussed action blocks across the bottom of CRT 63.

At block 703, program 700 sets up the pointers in memory 74 to paint (a) the predetermined heading of the directory screen, for example, LOCAL DIRECTORY, (b) predetermined lines that appear on the screen, such as the horizontal line which separates the tabs from the displayed name entries, and (c) predetermined labels, such as the label ALPHA/GROUP.

At block 704, program 700 stores the pointers in memory 74 which direct video circuit 70 to the predetermined information that will paint the touch targets, such as touch targets 11 through 17, on directory screen 10.

At block 705, program 700 determines the tab labels for touch targets 11 through 17 and stores that information along with the pointers in memory 74. Block 705 determines the tab labels by setting a variable called "Index" to unity and indexing the name records of the directory stored in memory 62. On the first pass through the directory, block 705 unloads the first name stored therein. The unloaded name is truncated if it is greater than six characters and is stored in a register whose contents will be stored in memory 74 when the tab labels have been assembled. Block 705 then adds illustratively the value 15 to Index and again accesses the directory name records to unload the sixteenth name. That name is also truncated if it is greater than six characters and is also stored in the register. At the end of each pass through the directory, the value 15 is added to the Index. In this way, block 705 unloads the thirty-first, forty-sixth, etc. names from the directory for display as tab labels. Block 705 does this as long as the Index is less than illustratively 105 (which is the number of names that can be stored in the directory). When the value of Index is greater than 105, block 705 loads the contents of the register into memory 74 and sets a pointer which points to the address of the stored labels.

At block 706, program 700 highlights (using inverse video) the label of the touch target 11 through 17 which was last activated (touched) by the user. If the user has not yet touched one of the targets 11 through 17, then the label of touch target 11 is highlighted by default. Block 706 also highlights either ALPHA or GROUP of the ALPHA/GROUP label. If the directory is in the alphabetic mode, ALPHA is highlighted; otherwise, GROUP is highlighted.

At block 707, program 700 assembles the information for painting the name entries on the directory screen as discussed below in connection with FIG. 8.

Figure 8:
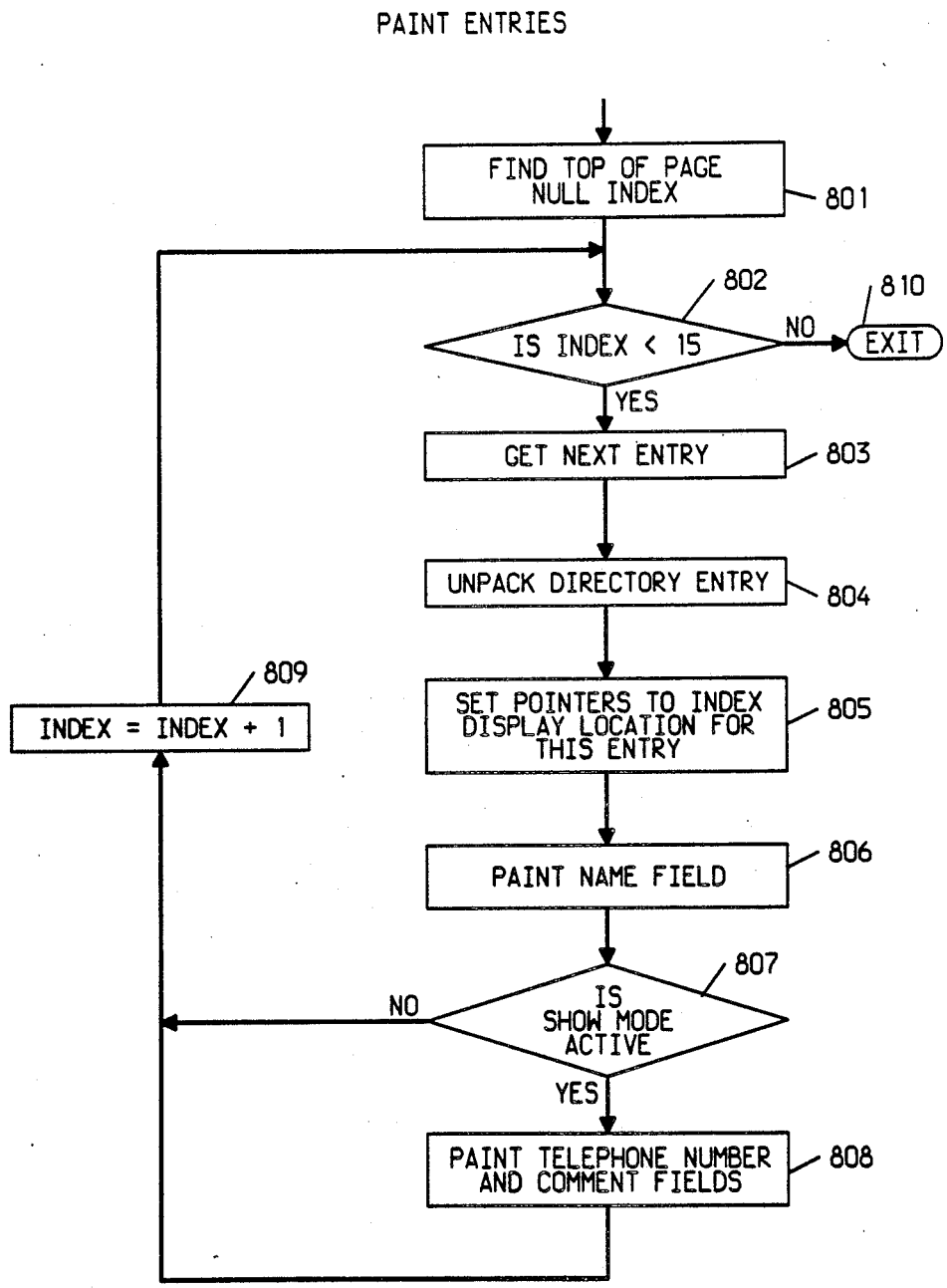
FIG. 8 is an expanded program flow chart of a portion of FIG. 7.

Turning now to FIG. 8, there is shown an expanded version of block 707 of FIG. 7. The flow chart comprising blocks 801 through 810 is invoked to paint the group of directory name entries that are associated with the active one of tabs 11 through 17.

In particular, at block 801, the program determines which one of the tabs 11 through 17 is the active tab and sets an index designated TP (which represents the start of a page in the directory) to the value of the active tab and adds thereto the address of the first name record stored in the directory. For example, if tab 13 is active, TP is set to 31, since that value represents the top of a group, or page, comprising the thirty-first through forty-fifth records in the directory. In addition, block 801 sets a variable called "Index" to 0.

At block 803, the program unloads the name record stored at the directory location identified by the value of TP incremented by the value of Index. Thus, during the first pass through the program, the first name record of the page of records is unloaded from memory 62.

At block 804, the name contained in the unloaded name record is reformatted (unpacked) and stored in the RAM portion of memory 74 for display on CRT 63. At block 805, the pointers which point to the location of the stored name are set for video circuit 70, and the name is painted on the screen at block 806.

At block 807, the program determines if the show mode is active. If it is, the program proceeds to block 808; otherwise, it proceeds to block 809.

At block 808, the program unloads the telephone number and comment associated with the last name unloaded from the directory. That information is also reformatted and stored in the RAM section of memory 74 for display on CRT 63.

At block 809, the program increments the value of Index by unity and proceeds to block 802. At block 802, the value of Index is compared with the value of 15. If the program determines that the value of Index is less than 15, it proceeds to block 803; otherwise, it exits via block 810.

Figure 9:
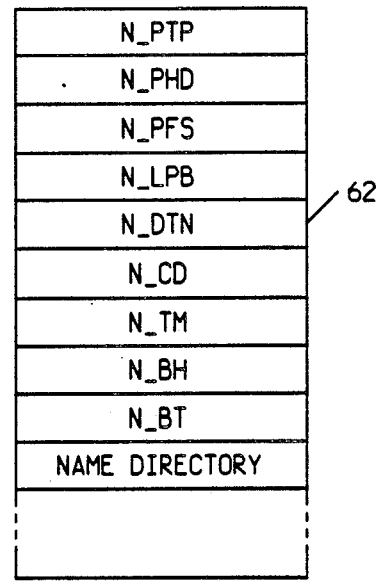
FIG. 9 illustrates a portion of memory contained within the terminal of FIG. 5 in which is stored the program modules of FIG. 6 and in which is stored the telephone directory.

FIG. 9 illustrates a layout of the program modules of FIG. 6 stored in memory 62 and also illustrates the memory layout of the name and telephone number directory. The program module of block 601 (N_TP) also includes the programs shown in FIGS. 7 and 8.

Conclusion

Although a specific embodiment of this invention has been shown and described in the context of the PT510, it will be understood that it may be practiced with typically any commercially available personal computer or workstation. For example, in those personal terminals not having a touch-sensitive overlay, a tab can be pointed to by moving the screen cursor to the tab and operating illustratively the ENTER key on the terminal's keyboard.

What is claimed is:

1. An arrangement for use in a terminal having a display, said terminal being adapted to display any one of a plurality of different screens, one of said screens being used in conjunction with a directory feature of the kin in which a list of alphabetic entries are stored in said terminal, said arrangement comprising
    means for changing the composition of said list,
    means responsive to a request from a user of said terminal for displaying said directory screen on said display,
    means responsive to each such request for creating from the then current composition of said list a plurality of tab labels representing respective ones of said entries and for presenting on said display at least said tab labels, said tab labels being selected from said list in accordance with a predetermined selection criterion, and
    means thereafter operative in response to the selection of a particular one of said tab labels by said user for presenting on said display the respective entry and a plurality of those of said entries that immediately succeed it alphabetically.

2. A directory arrangement for a terminal having a display comprising
    means for storing a directory composed of a number of changeable entries,
    means for displaying a plurality of labels identifying respective terminal screens, each of said screens being displayed on said display when a user of said terminal points to its respective label, one of said labels identifying a directory screen,
    means responsive each time said user points to said directory label for selecting from the then current composition of said directory individual ones of said entries which meet a predefined selection criterion and forming them into respective tabs and for displaying said tabs in conjunction with said directory screen, and
    means thereafter responsive to said user pointing to an individual one of said tabs for displaying the respective entry and a predetermined number of other ones of said entries, said other entries being such that they succeed said respective entry in accordance with a predefined order of succession.

3. The invention set forth in claim 2 wherein said means for displaying said entries includes means for displaying telephone numbers associated with respective ones of said displayed entries.

4. The invention set forth in claim 3 further comprising means for dialing the telephone number associated with an individual one of said displayed entries that is being pointed to by said user.

5. The invention set forth in claim 2 further comprising means for displaying the entry associated with a predetermined one of said tabs and said predetermined number of succeeding entries at a point in time prior to said user pointing to one of said displayed tabs.

6. An arrangement for use in a terminal adapted to display a plurality of labels associated with respective screens, one of said screens being a directory screen, said terminal having a display, said arrangement comprising
    means for storing a number of entries as a directory of entries,
    means for adding entries to said directory and for deleting entries therefrom,
    means responsive each time a user of said terminal points to the label associated with said directory screen for selecting from the then current composition of said directory individual ones of said entries which meet a predetermined selection criterion and forming them into respective tab labels representing respective groups of said entries and for presenting at least said tab labels on said display, and
    means for displaying on said display an individual one of said groups when the respective one of said tab labels is pointed to by said user.

7. The invention set forth in claim 6 wherein said means for displaying said entries includes means for displaying telephone numbers associated with respective ones of said displayed entries.

8. The invention set forth in claim 7 further comprising means for dialing the telephone number associated with an individual one of said displayed entries that is being pointed to by said user.

9. The invention set forth in claim 6 further comprising means for displaying one of said groups of entries at a point in time prior to said user pointing to one of said displayed labels.

* * * * *

UNITED STATES PATENT AND TRADEMARK OFFICE
CERTIFICATE OF CORRECTION

PATENT NO. : 4,899,377
DATED : February 6, 1990
INVENTOR(S) : E. J. Bauer, E. L. Davenport, M. Kinal, M. C. King It is certified that error appears in the above-identified patent and that said Letters Patent is hereby corrected as shown below:

Column 1, line 21, "tee" should read --the--.
Column 11, line 17, "kin" should read --kind--.

Signed and Sealed this

Sixth Day of August, 1991

*Attest:*

HARRY F. MANBECK, JR.

*Attesting Officer*      *Commissioner of Patents and Trademarks*